United States Patent Office 3,795,635
Patented Mar. 5, 1974

3,795,635
ACRYLONITRILE COPOLYMERS
Xavier Marze and Jean-Pierre Quentin, Lyon, France, assignors to Rhone-Poulenc S.A., Paris, France
No Drawing. Filed Sept. 29, 1971, Ser. No. 184,897
Claims priority, application France, Oct. 1, 1970, 7035526
Int. Cl. C08f *15/02, 19/00*
U.S. Cl. 260—2.1 E      14 Claims

ABSTRACT OF THE DISCLOSURE

Unshaped or shaped, crosslinked copolymers which comprise a carbon-carbon linear chain comprising recurring units of the formula:

(i) 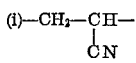

and of formula:

(ii) 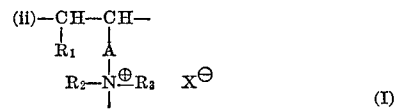 (I)

and/or (iii) 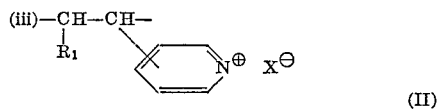 (II)

in which $R_1$ represents a hydrogen atom or a lower alkyl radical; each of $R_2$ and $R_3$, which may be the same or different, represents an alkyl radical having 1 to 10 carbon atoms or $R_2$ and $R_3$ together form a divalent alkylene or alkenylene radical;
A represents a divalent aromatic or arylaliphatic radical, or a radical of formula $-CO-O-(CH_2)_m-$ in which $m$ is a positive integer, the terminal methylene group being attached to the nitrogen atom;
the pyridine nucleus is optionally substituted by one or more hydrocarbon radicals $R_4$ having at most 10 carbon atoms, optionally substituted by functional groups;
X represents an inorganic or organic anion; and the nitrogen atoms are connected to one another by polyvalent organic radicals R, are provided from which membranes having useful ion-exchange properties and permeation properties can be obtained.

---

The present invention relates to crosslinked copolymers derived from acrylonitrile and nitrogen-containing monomers.

The present invention provides an unshaped or shaped, crosslinked copolymer which comprises a carbon-carbon linear chain comprising recurring cyanoethylene units i.e. of Formula i

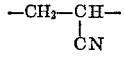

and recurring units of formula

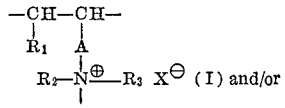 (I) and/or 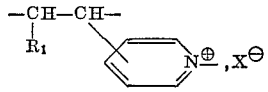

in which $R^1$ represents a hydrogen atom or a lower alkyl radical such as a methyl radical,
each of $R_2$ and $R_3$, which may be the same or different, represents an alkyl radical having 1 to 10 carbon atoms or $R_2$ and $R_3$ together form a divalent alkylene or alkenylene radical, preferably having 4 or 5 carbon atoms;
A represents a divalent aromatic or arylaliphatic radical, preferably having 6 to 12 carbon atoms, or a radical of formula $-CO-O-(CH_{2m}-$ in which $m$ is a positive integer, the radical A being, in this case, attached to the nitrogen atom by the carbon atom of its terminal methylene group;
the pyridine nucleus is optionally substituted by one or more hydrocarbon radicals $R_4$ having at most 10 carbon atoms, for example a methyl, ethyl, propyl, butyl, cyclohexyl or benzyl radical, the said radicals being optionally substituted by functional groups; and
X represents an inorganic or organic anion; and
the nitrogen atoms are connected to one another by polyvalent organic radicals R.

By "lower alkyl" as used herein is meant alkyl radicals possessing from 1 to 4 carbon atoms.
Suitable radicals R, which can be used, include radicals of formula $-CH_2-Ar-CH_2-$ wherein Ar represents an aromatic radical, such as phenylene, toluylene and xylylene, the methylene groups being respectively in the ortho, meta or para positions.

The nature of the anion $X^-$ is not critical and it can be replaced by a different anion in accordance with the usual ion exchange techniques; typical anions include the halides, nitrates, sulphates, sulphites, phosphates and sulphonates.

Apart from the cyanoethylene units and the units (I) and (II), the linear chains defined above can optionally contain other units, especially units of formula:

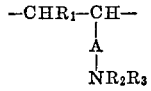 and/or 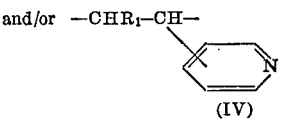

(III)      (IV)

as well as units of formula

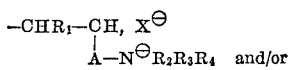

(V)

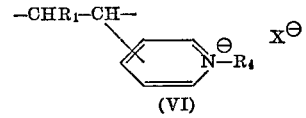

(VI)

in which the various symbols are as defined above and the pyridine nuclei are optionally substituted as indicated above. The various anions $X^-$ of the units of Formulas I, II, V and VI can be identical or different. In the various above formulas, the radicals $R_4$ may be identical or different.

In the following description the term "nitrogen-containing monomer" will be used for the monomers having a tertiary nitrogen atom, of formula $CHR_1=CH-A-NR_2R_3$ (VII) or 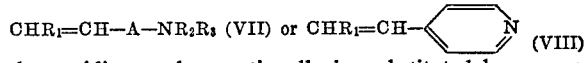 (VIII)

the pyridine nucleus optionally be substituted by one or more hydrocarbon radicals such as defined above for $R_4$.

The description "polyquaternizing agent" will be used to denote a chemical compound capable of quaternizing at least two tertiary nitrogen atoms.

The copolymers of this invention can usually be prepared by reacting a polyquaternizing agent with a nongrafted (random) copolymer of acrylonitrile and suitable nitrogen-containing monomer. This reaction will hereafter be described as the "quaternizing crosslinking."

The copolymer of acrylonitrile and nitrogen-containing monomer can be prepared in accordance with any known method such as that described in British patent specification No. 796,294; advantageously copolymerization in solution in polar solvents, such as dimethylformamide and dimethylsulphoxide, and in the presence of a catalyst which generates free radicals, such as azobisisobutyronitrile, at a temperature where the decomposition of the catalyst into free radicals occurs, is employed.

The specific viscosity of the starting copolymer derived from the acrylonitrile and the nitrogen-containing monomer is generally between 0.1 and 1, preferably between 0.2 and 0.6 (measured at 25° C. on a solution of 2 g./l. in dimethylformamide).

The nitrogen-containing monomers which can be used (Formulae VII and VIII, can, in particular, be ethylenically unsaturated monomers which carry a substituent containing a cyclic radical of aromatic nature having a tertiary intranuclear, juxtanuclear or extranuclear nitrogen atom.

Suitable monomers with an intranuclear tertiary nitrogen atom (Formula VIII include 2-vinylpyridine and 4-vinylpyridine as well as substituted derivatives thereof, for example the vinylpicolines, such as 2-methyl-5-vinyl-pyridine, and the vinyllutidines.

Suitable monomers with a juxtanuclear tertiary nitrogen atom (Formula VII with A representing an aromatic radical) include the N,N-dialkylaminovinylbenzenes such as para-dimethylaminostyrene, and their substituted derivatives.

Suitable monomers with an extranuclear tertiary nitrogen atom (Formula VII with A representing an arylaliphatic radical) include (N,N-dialkyl)-aminoalkyl-para-vinylbenzenes and their substitution derivatives, with the alkyl groups preferably possessing 1 to 4 carbon atoms.

Other nitrogen-containing monomers which can be used in this invention and which are represented by Formula VII include the (dialkylamino) alkyl acrylates and methacrylates with alkyl radicals generally having up to 6 carbon atoms, such as the dimethylaminomethyl, dimethylaminoethyl, dimethylaminopropyl, dimethylaminohexyl, diethylaminomethyl, diethylaminoethyl, diethylaminobutyl, diethylaminohexyl, dibutylaminoethyl, dibutylaminohexyl and dihexylaminohexyl acrylates and methacrylates.

After the starting copolymer derived from the acrylonitrile and the nitrogen-containing monomer has been obtained, the quaternizing crosslinking is carried out.

Apart from the acrylonitrile and the nitrogen-containing monomer forming the initial non-grafted copolymer of acrylonitrile and nitrogen-containing monomer, other comonomers can be used, for example those known to be capable of copolymerizing with acrylonitrile; amongst these there may be mentioned ethylenic hydrocarbons such as butadiene and styrene; vinyl and vinylidene chlorides; vinyl ethers, unsaturated ketones such as butenone, phenyl vinyl ketone and methyl isopropenyl ketone; vinyl esters of saturated or unsaturated carboxylic acids, for example formates, acetates, propionates, butyrates and benzoates; esters of unsaturated monocarboxylic or polycarboxylic aliphatic acids, such as the acrylates, methacrylates, maleates, fumarates, citraconates, mesaconates and itaconates, these esters being alkyl esters, for example methyl, ethyl, propyl, butyl or $\beta$-hydroxyethyl esters, cycloalkyl esters or aryl esters; acrylamide and methacrylamide and their N-substituted derivatives.

The polyquaternizing agents used in the process are, principally, polyhalogenated derivatives of alkanes, cycloalkanes or arylalkanes, especially alkylene, cycloalkylene or arylalkylene dihalides, and polyhalogenated polymers, all these polyhalogenated derivatives possessing at least two halogen atoms carried by non-vicinal carbon atoms. They have the general formula $RY_n$, wherein R is a polyvalent organic radical of valency $n$, $n$ is an integer preferably equal to 2, and Y is a halogen atom. Typical polyquaternizing agents include 1,3-dichloropropane, 1,3-dibromopropane, 1,4-dichlorobutane, 1,4-dibromobutane, 1,4-diiodobutane, 1,4 - dichlorobutene - 2, the bis(chloromethyl)benzenes, bis(chloromethyl)toluenes, bis(chloromethyl)xylenes, 1,3-bis(chloromethyl-1,1,3,3-tetramethyldisiloxane, polyepichlorohydrin and $\alpha$-chlorinated polyethers such as chlorinated polyethylene glycol.

The quaternizing crosslinking is suitably effected by bringing the polyquaternizing agent into contact with the copolymer of acrylonitrile and nitrogen-containing monomer at a temperature of between 10° and 100° C., preferably between 25° and 70° C., either by external means, the polyquaternizing agent being in the form of a solution and the copolymer being in the solid state, or by internal means, the polyquaternizing agent having been mixed with the copolymer in solution before reaction. The degree of crosslinking, that is to say the proportion by number of units (I) and/or (II) relative to the total number of units (I), (II), (III), (IV), (V) and (VI) (if present), is usually above 50% and preferably above 80%.

The solvents optionally used during the quaternizing crosslinking should be solvents capable of dissolving the polyquaternizing agent and also capable of swelling or dissolving the treated copolymer. Suitable solvents include alcohols such as ethanol, propanol, isopropanol, isobutanol and tertiary butanol, and aprotic polar solvents such as dimethylsulphoxide, dimethylformamide, ethylene carbonate and propylene carbonate.

The present invention also provides membranes which comprise, as the essential constituent, an acrylonitrile copolymer of the present invention. These membranes can be prepared by any known process especially by extrusion, calendering, pressing, or, according to a preferred process, by solution casting; the shaping of the membranes can be effected in all cases before the end of the quaternizing crosslinking and can even be effected on the non-crosslinked acrylonitrile copolymer; the quaternization is then usually carried out by immersing a film of the acrylonitrile copolymer in a solution of the polyquaternizing agent.

Screen-reinforced membranes can be prepared by incorporating a reinforcing support into the acrylonitrile copolymer; this incorporation can be effected preferably by a coating or pressing technique; typical screens include nets and woven fabrics; these screens generally constitute (in the case of screen reinforced membranes) 10 to 70%, preferably 20 to 40%, by weight of the membrane.

The products (including membrane) thus obtained by quaternizing crosslinking can also be subjected to a simple quaternization using a monoquaternizing agent, especially so as to quaternize as high a proportion as possible, and preferably the whole, of the tertiary nitrogen atoms initially present. This simple quaternization gives rise to units of Formula V or VI. Preferably, this simple quarternization takes place after the quaternizing crosslinking; however, carrying out a partial quaternization without crosslinking before the quaternizing crosslinking phase is not excluded. The method used for this simple quaternization is similar to that used for the quaternizing crosslinking. Anyway the ratio of quaternary ammonium groups in the copolymer of this invention is generally between 0.2 and 3 milliequivalent, preferably between 0.7 and 1.5 meq. per gram of copolymer.

Monoquaternizing agents which can be represented by the formula $R_4X$, in which $R_4$ and X are as defined above, may be used, including esters of inorganic acids, preferably alkyl, cycloalkyl or aralkyl halides and sulphates. Monoquaternizing agents in which the alkyl, cycloalkyl or aralkyl radical contains at most 14 carbon atoms are particularly suitable. In particular, the methyl, ethyl, propyl, benzyl and cyclohexyl chlorides, bromides and iodides, dimethylsulphates and diethylsulphates may be mentioned. Halogenated derivatives containing other chemical groups, such as chloroacetaldehyde and bromoacetaldehyde, are also suitable.

The copolymers of this invention can generally be used in all applications which employ the phenomenon of ionic exchange. The membranes according to the invention can, in particular, be used in electrodialysis and in fuel cells, they can also, in certain circumstances, be used where the phenomenon of ion exchange is not employed, such as in permeation processes especially inverse osmosis, dialysis and ultrafiltration.

The copolymers of this invention are particularly suitable in the form of membranes for artificial kidneys, because they afford a good urea/salt selectivity (the urea/salt selectivity is the ratio $$\frac{\text{permeability of an aqueous solution of urea across the membrane}}{\text{permeability of an aqueous solution of NaCl across the membrane}}$$

In the following examples which further illustrate the present invention, the various measurements were carried out as follows:

(a) Electrical substitution resistance: the term "electrical substitution resistance" for a given membrane surface area is the change in electrical resistance of a cylinder of liquid if the membrane is replaced by a volume of liquid of the same thickness and the same surface area as the membrane, in a position at right angles to the axis of the cylinder. Here, this substitution resistance is measured in an 0.6 M aqueous solution of KCl and is expressed in ohm. cm.$^2$.

(b) Permeation selectivity: This relates to the ability of the membrane to allow only anions to pass through it, while excluding cations. The permeation selectivity value is obtained by calculation from the measurement of the electromotive force (E) existing between two aqueous KCl solutions, respectively 0.4 M and 0.8 M, separated by the membrane in question, which has beforehand been saturated with an 0.6 M aqueous KCl solution.

The formula which gives the permeation selectivity as a percentage is:

$$\frac{P}{100} = \frac{\bar{t} - t}{1 - t}$$

in which $t$ is the transport number of $Cl^-$ in an 0.6 M aqueous KCl solution and $\bar{t}$ is the transport number of $Cl^-$ in the membrane.

$\bar{t}$ is given by the formula:

$$\bar{t} = \frac{E + E_o}{2E_o}$$

in which $$E_o = \frac{RT}{F} \ln \frac{a_1}{a_2}$$

wherein R=gas constant, T=absolute temperature, F=Faraday constant (96,489 colombs per gram equivalent), $a_1$=activity of the electrolyte in the more concentrated compartment (calculated from the concentration of the electrolyte and the activity coefficient), and $a_2$=activity of the electrolyte in the less concentrated compartment.

(c) Bursting strength (in Example 10): this is measured according to standard specification PN AFNOR Q 0314, which relates to testing paper and cardboard. A membrane fixed to a support frame, leaving a free surface area of 10 cm.$^2$, is subjected to a hydraulic pressure by means of a rubber membrane. The hydraulic pressure (in bars) after bursting, as well as the deflection in mm. of the membrane at the time of bursting are measured.

(d) Water transfer (in Example 7): the amount of water which has migrated through a membrane placed in a cell divided by the membrane into two compartments, one containing pure water and the other containing a 1.2 M aqueous KCl solution, is measured. This water transfer is expressed in mm.$^3$ per hour per cm.$^2$ of membrane and for a difference in concentration of 1 mol/liter between the two solutions.

EXAMPLES 1 TO 9

A series of membranes based on acrylonitrile and 2-methyl-5-vinylpyridine was prepared:

(A) Preparation of the copolymer of acrylonitrile and nitrogen-containing monomer.

0.225 g. of stannous oxalate, 225 g. of dimethylsulphoxide and 75 g. of a mixture of acrylonitrile and 2-methyl-5-vinylpyridine, the respective amounts of these two monomers being indicated in Table I, were introduced into a 500 cm.$^3$ reactor, equipped with a stirrer, a reflux condenser and a thermometer and filled with a nitrogen atmosphere.

The temperature was raised to 65° C., 0.675 g. of azobisisobutyronitrile was added and the temperature maintained at 65° C. for 4 hours. The solution obtained was poured into water; the polymer thus precipitated was filtered off, washed with hot water (75° C.) and dried at 50° C. under a reduced pressure (100 mm./Hg).

A solution of 2 g. of this copolymer in 20 cm.$^3$ of dimethylformamide was treated with 2,5-bis(chloromethyl)-1,4-dimethyl-benzene and, sometimes, with methylsulphate (see Table I); the solution obtained was cast on a 10 cm. x 10 cm. glass plate. The whole was heated to 60° C. in an oven for 24 hours. The membrane was detached and its properties measured (see Table I).

The membrane of Example 7 showed a water transfer of 9.2 mm.$^3$ per hour per cm.$^2$.

TABLE I

| Ex. | Amount of acrylonitrile employed, in g. | Amount of 2-methyl-5-vinyl-pyridine, in g. | Weight of non-cross-linked copolymer obtained | Percent by weight of nitrogen-containing monomer which has co-polymerized | Specific viscosity of the non-cross linked copolymer [1] | Amount of bischloro-methyldi-methylben-zene used, in g. | Amount of methylsul-phate used, in g. | Substitution resistance in $\Omega$.cm.$^2$ | Permeation selectivity in percent |
|---|---|---|---|---|---|---|---|---|---|
| 1 | 67.5 | 7.5 | 54.5 | 12.8 | 0.396 | 0.15 | 0.27 | 1 | 84 |
| 2 | 63.75 | 11.25 | 57 | 18 | 0.357 | 0.5 | 0 | 19 | 91 |
| 3 | 63.75 | 11.25 | 57 | 18 | 0.357 | 0.25 | 0.27 | 5 | 85 |
| 4 | 63.75 | 11.25 | 57 | 18 | 0.357 | 0.3 | 0.135 | 8 | 87 |
| 5 | 63.75 | 11.25 | 57 | 18 | 0.357 | 0.3 | 0.27 | 7.5 | 86 |
| 6 | 60 | 15 | 48 | 30 | 0.281 | 0.5 | 0 | 8 | 80 |
| 7 | 60 | 15 | 48 | 30 | 0.281 | 0.25 | 0.31 | 3.5 | 84 |
| 8 | 56.25 | 18.75 | 56.5 | 31 | 0.306 | 0.5 | 0 | 9 | 85 |
| 9 | 52.5 | 22.5 | 56 | 37.5 | 0.284 | 0.5 | 0 | 3 | 82 |

[1] Measurement carried out at 25° C. at a concentration of 2 g./l. in dimethylformamide.

EXAMPLE 10

A non-crosslinked copolymer of acrylonitrile and a nitrogen-containing monomer was prepared as in Example 2, replacing the 2-methyl - 5 - vinylpyridine by 4-vinylpyridine. 59 g. of copolymer containing 17.85% of copolymerized vinylpyridine and having a specific viscosity, measured as above, of 0.341 were obtained.

0.3 g. of 2,5-bis(chloromethyl) - 1,4 - dimethylbenzene and 0.37 g. of methylsulphate were added to a solution of 4 g. of this copolymer in 43 cm.$^3$ of dimethylformamide; the solution obtained was cast on a 180 cm.$^2$ glass plate; the whole was heated to 65° C. for 24 hours. The membrane was detached and its properties are measured as before:

Substitution resistance _____ Ω cm.² __ 4.5
Permeation selectivity _____ percent __ 83
Bursting pressure _____ bars __ 5
Deflection at time of rupture _____ mm __ 18

EXAMPLES 11 TO 16

A series of ionic membranes was prepared from two types of copolymers, $A_1$ and B.

(A) Preparation of the copolymer $A_1$ 1,875 g. of dimethylsulphoxide, 531 g. of acrylonitrile, 1.87 g. of stannous oxalate and 94 g. of dimethylaminoethyl methacrylate were introduced into a nitrogen filled reactor. The mixture was heated to 65° C., a solution of 5.63 g. of azobisisobutyronitrile in 100 cm.³ of dimethylsulphoxide was added, and the temperature maintained at 65° C. for 4 hours. 3.75 l. of dimethylformamide (DMF) were then added followed by 12 l. of water, added gradually over the course of 1 hour. After washing and drying, 406 g. of copolymer $A_1$ were obtained, containing 19% by weight of copolymerized dimethylaminoethyl methacrylate radicals, this copolymer $A_1$ had a specific viscosity of 0.182 (measured at 25° on a solution of 2 g./l. in dimethylformamide).

(B) Preparation of the copolymer B

The procedure under A was followed, the amounts of reactants being: 1,875 g. of dimethylsulphoxide, 500 g. of acrylonitrile, 1.87 g. of stannous oxalate, 125 g. of dimethylaminoethyl methacrylate and 5.63 g. of azobisisobutyronitrile.

The copolymer B obtained contained 26.8% by weight of dimethylaminoethyl methacrylate radicals; its specific viscosity, measured as above, was 0.131.

(C) Preparation of membranes

A solution of 2 g. of copolymer A or B in 20 cm.³ of DMF was treated with 2,5-bis(chloromethyl)-1,4-dimethylbenzene, as a 5% solution in DMF, and with methylsulphate; the solution was cast on a glass plate (20 x 30 cm.) and the whole was then heated to 60° C. for 20 hours; the membrane was detached and its properties measured.

Table II shows, for the various membranes, the nature of the copolymer employed, the volume, in cm.³, of bischloromethylbenzene solution used, the volume, in cm.³, of methylsulphate used, and the properties of the membranes.

TABLE II

|  | Example | | | | | |
|---|---|---|---|---|---|---|
|  | 11 | 12 | 13 | 14 | 15 | 16 |
| Copolymer | A¹ | A¹ | A¹ | A¹ | B | B |
| Bis(chloromethyl)benzene | 4.32 | 8.64 | 4.32 | 1.62 | 6.24 | 9.36 |
| Methylsulphate | 0 | 0 | 0.1 | 0.12 | 0 | 0 |
| Permeation selectivity, percent | 90 | 90.5 | 87 | 84.5 | 84.5 | 89 |
| Substitution resistance, ohm.cm.² | 5.5 | 13 | 3 | 1.5 | 3.5 | 3.5 |
| Thickness in microns | 30 | 40 | 40 | 40 | 40 | 35 |

We claim:

1. An ungrafted, cross-linked ion exchange resin copolymer of acrylonitrile with an ethylenically unsaturated monomer carrying a cyclic radical of aromatic nature having a tertiary intranuclear, juxtanuclear, or extranuclear nitrogen atom and/or a dialkylaminoalkyl acrylate or dialkylaminoalkyl (lower alkyl)acrylate comprising recurring units of the formula (i) 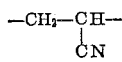

and of the formula (ii) 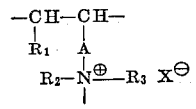 (I)

and/or (iii)  (II)

in which $R_1$ represents a hydrogen atom or a lower alkyl radical, each of $R_2$ and $R_3$, which may be the same or different, represents an alkyl radical having 1 to 10 carbon atoms or $R_2$ and $R_3$ together form a divalent alkylene or alkenylene radical;

A represents a divalent aromatic or arylaliphatic radical, or a radical of formula $-CO-O-(CH_2)_m-$ in which $m$ is a positive integer, the terminal methylene group being attached to the nitrogen atom, X represents an inorganic or organic anion; and the nitrogen atoms are connected to one another by polyvalent organic radical resulting from cross-linking with polyquaternizing agents selected from the group consisting of alkylene, cycloalkylene, and arylalkylene dihalides; 1,4 - dichlorobutene-2; 1,3 - bis(chloromethyl-1,1,3,3-tetramethyl)disiloxane, polyepichlorohydrin and α-chlorinated polyethers, the number of units of Formula I and/or II relative to the total number of units in the copolymer being at least 50%.

2. A copolymer according to claim 1 which also comprises recurring units of formula:

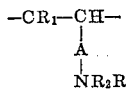 and/or 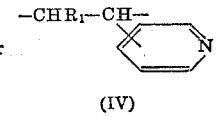
(III) (IV)

and/or

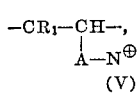 and/or 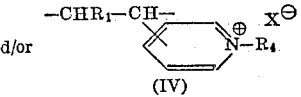
(V) (IV)

in which $R_1$, $R_2$, $R_3$, $R_4$, A and X are defined in claim 1 and the pyridine nuclei can be substituted by one or more radicals $R_4$ as defined in claim 1.

3. A copolymer according to claim 1 in which the polyvalent organic radical is $-CH_2-Ar-CH_2-$, wherein Ar represents a phenylene radical, optionally substituted by one or two methyl radicals, the methylene groups being attached in the ortho, meta or para positions.

4. A copolymer according to claim 1 in which $R_1$ represents a methyl radical.

5. A copolymer according to claim 1 in which $R_2$ and/or $R_3$ represents an alkylene radical having 4 or 5 carbon atoms.

6. A copolymer according to claim 1 in which A represents a divalent aromatic or arylaliphatic radical having 6 to 12 carbon atoms.

7. A copolymer according to claim 1 in which A represents a radical of the formula: $-CO-O-(CH_2)_2-$.

8. A copolymer according to claim 1 in which $R_4$ represents a methyl, ethyl, propyl, butyl, cyclohexyl or benzyl radical.

9. A copolymer according to claim 1 in which X represents a halide, nitrate, sulphate, sulphite, phosphate or sulphonate ion.

10. A copolymer according to claim 1 in which the number of units (I) and/or (II) represents at least 80% of the number of units (I), (II), (III), (IV), (V) and (VI) present in the copolymer.

11. A copolymer according to claim 1 in the form of a membrane.

12. A copolymer according to claim 3 in which the polyvalent organic radical is:

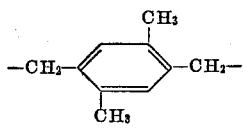

13. A copolymer according to claim 1 in which $m$ is 2.

14. An ungrafted, cross-linked ion exchange resin copolymer of acrylonitrile with an ethylenically unsaturated monomer carrying a cyclic radical of aromatic nature having a tertiary intranuclear, juxtanuclear or extranuclear nitrogen atom and/or a dialkyl aminoalkyl acrylate or dialkylaminoalkyl (lower alkyl) acrylate comprising recurring units of the formula:

(I)

and of the formula:

(ii)

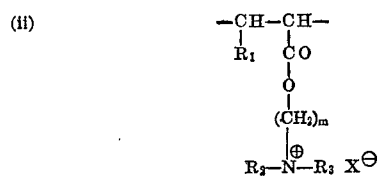 (I)

and optionally (iii)

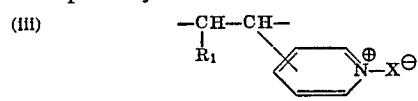 (II)

in which $R_1$ represents a hydrogen atom or a lower alkyl radical; each of $R_2$ and $R_3$, which may be the same or different; represents an alkyl radical having 1 to 10 carbon atoms or $R_2$ and $R_3$ together form a divalent alkylene or alkenylene radical;

X represents an inorganic or organic anion;

$m$ represents an integer from 1 to 6; and the nitrogen atoms are connected to one another by polyvalent organic radicals resulting from cross-linking with polyquaternizing agents selected from the group consisting of alkylene, cycloalkylene, and arylalkylene dihalides; 1,4-dichlorobutene-2; 1,3 - bis(chloromethyl - 1,1,3,3-tetramethyl)disiloxane, polyepichlorohydrin and α-chlorinated polyethers, the number of units of Formula I and/or Formula II relative to the total number of units in the copolymer being at least 50%.

References Cited

UNITED STATES PATENTS

| | | | |
|---|---|---|---|
| 2,970,132 | 1/1961 | Reynolds et al. | 260—86.1 |
| 3,242,138 | 3/1966 | Van Paesschen | 260—65 |
| 3,383,336 | 5/1968 | Kuyama et al. | 260—2.2 |
| 3,644,225 | 2/1972 | Quentin et al. | 260—2.1 E |

FOREIGN PATENTS 1,312,642   12/1962   France.

OTHER REFERENCES

Wolf et al.: Fresenius' Z. Anal. Chem. 238, 432–41 (1968).

MELVIN GOLDSTEIN, Primary Examiner

U.S. Cl. X.R.

204—296; 260—2.1 C